US010063007B2

(12) United States Patent
Sugimoto

(10) Patent No.: US 10,063,007 B2
(45) Date of Patent: Aug. 28, 2018

(54) WIRE COVER

(71) Applicant: Sumitomo Wiring Systems, Ltd., Yokkaichi, Mie (JP)

(72) Inventor: Shinpei Sugimoto, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 73 days.

(21) Appl. No.: 15/245,224

(22) Filed: Aug. 24, 2016

(65) Prior Publication Data

US 2017/0085067 A1 Mar. 23, 2017

(30) Foreign Application Priority Data

Sep. 17, 2015 (JP) ................................ 2015-183849

(51) Int. Cl.

| | |
|---|---|
| ***H01R 13/56*** | (2006.01) |
| ***H01R 13/58*** | (2006.01) |
| ***H02G 3/04*** | (2006.01) |
| ***H02G 3/08*** | (2006.01) |
| ***H01R 4/00*** | (2006.01) |
| *H01B 17/26* | (2006.01) |
| *F16L 3/10* | (2006.01) |
| *H01R 13/506* | (2006.01) |
| *H01R 107/00* | (2006.01) |

(52) U.S. Cl.

CPC ........ *H01R 13/5812* (2013.01); *F16L 3/1058* (2013.01); *H01B 17/26* (2013.01); *H01R 13/506* (2013.01); *H01R 13/5825* (2013.01); *H01R 2107/00* (2013.01); *H02G 3/0418* (2013.01); *H02G 3/0437* (2013.01)

(58) Field of Classification Search

CPC ............ H01R 13/5812; H01R 13/5817; H01R 13/5825; H01B 17/26; H01B 17/38; F16L 3/1058; F16L 3/2336; H02G 3/0418; H02G 3/0486; H02G 3/0437

USPC .... 174/70 R, 68.3, 84 R, 535; 439/471, 465, 439/470, 466, 610

See application file for complete search history.

(56) References Cited

U.S. PATENT DOCUMENTS

| | | | | |
|---|---|---|---|---|
| 6,478,609 B1 * | 11/2002 | Davis | ................ | H01R 13/5812 439/465 |
| 7,044,795 B2 * | 5/2006 | Diep | .................... | H01R 9/0527 439/471 |
| 9,525,278 B2 * | 12/2016 | Suzuki | .............. | H01R 13/5825 |

(Continued)

FOREIGN PATENT DOCUMENTS

| | | |
|---|---|---|
| JP | 2002-343497 | 11/2002 |

*Primary Examiner* — Tan Le

(74) *Attorney, Agent, or Firm* — Gerald E. Hespos; Michael J. Porco; Matthew T. Hespos

(57) ABSTRACT

A wire cover (10) is mounted on a rear surface of a housing (30) so that a bundle of wires can be (31) pulled out in a predetermined direction from a rear surface of the housing (30). The wire cove (10) includes a band inserting portion (15) having a curved shape to extend along a part of an outer surface of the bundle of the wires (31) in a circumferential direction and defines a route for a binding member (40) for binding the bundle of the wires (30). A lock fixing portion (47) is provided on an end of the band inserting portion (15) in the circumferential direction and is configured to position a lock (42) of the binding member (40) for locking a band (41) wound around the bundle of wires (31) at a predetermined position, and a reinforcing portion (18) is provided on the lock fixing portion (17).

11 Claims, 19 Drawing Sheets

(56) References Cited

U.S. PATENT DOCUMENTS

| | | | | |
|---|---|---|---|---|
| 9,721,704 | B2 * | 8/2017 | Sugimoto | H01B 17/26 |
| 2002/0170736 | A1 * | 11/2002 | Yamashita | H01R 13/5837 174/84 R |
| 2015/0179301 | A1 * | 6/2015 | Suzuki | H01R 13/5825 174/68.3 |

* cited by examiner

F I G. 1
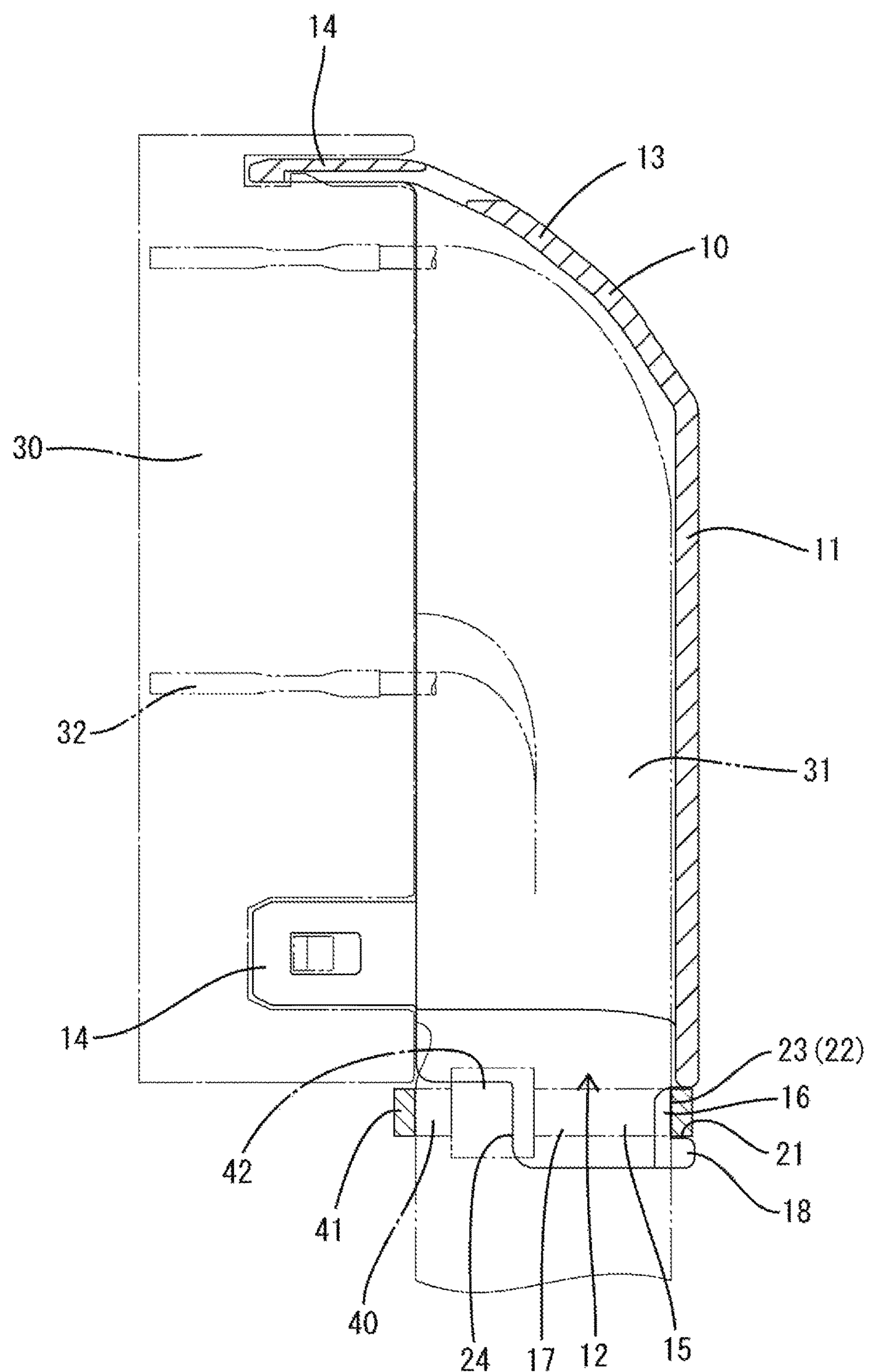

F I G . 2
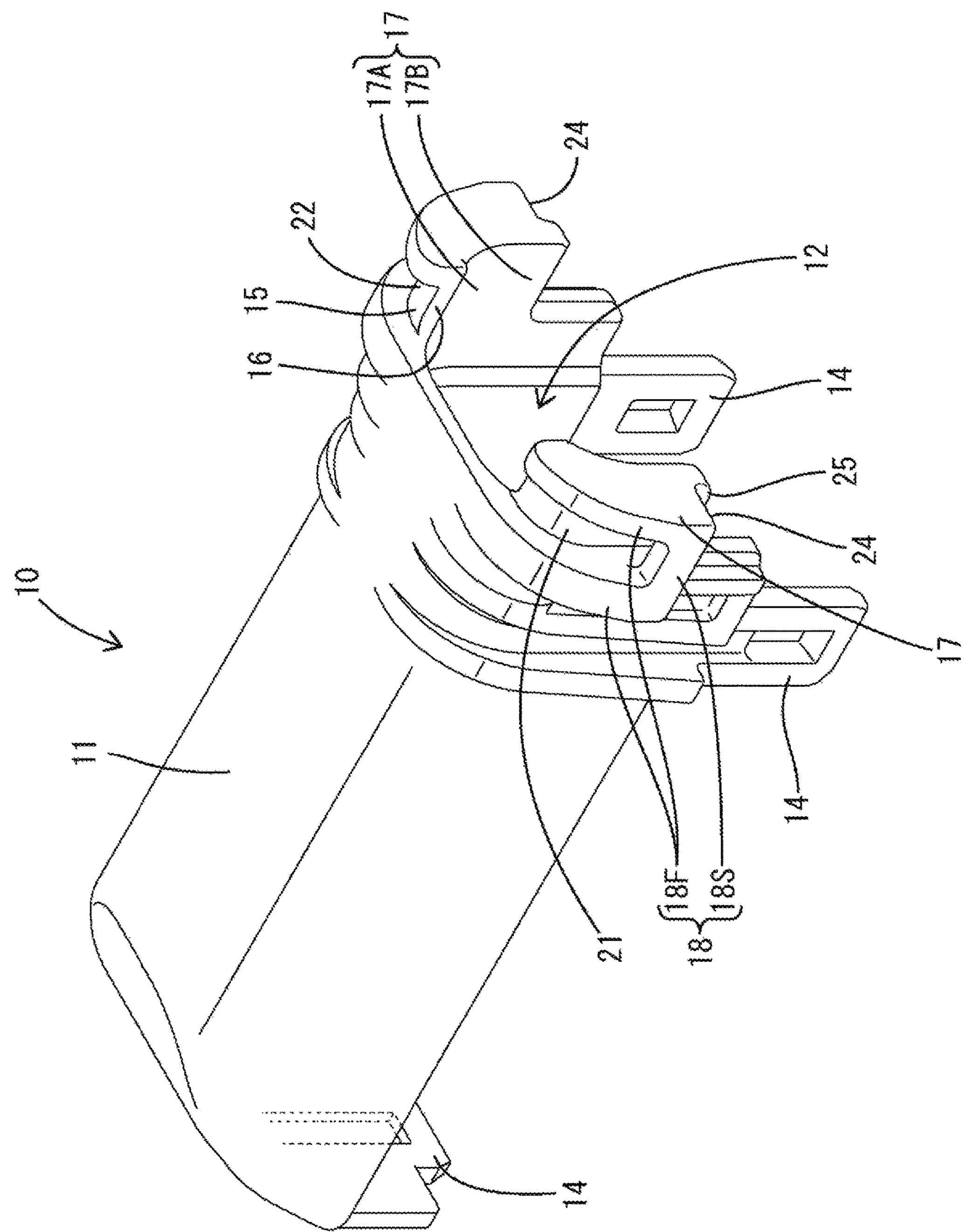

12
17
18S
18F
15
22
21
18F
19
24
25
A
A
14
10
11
13
14

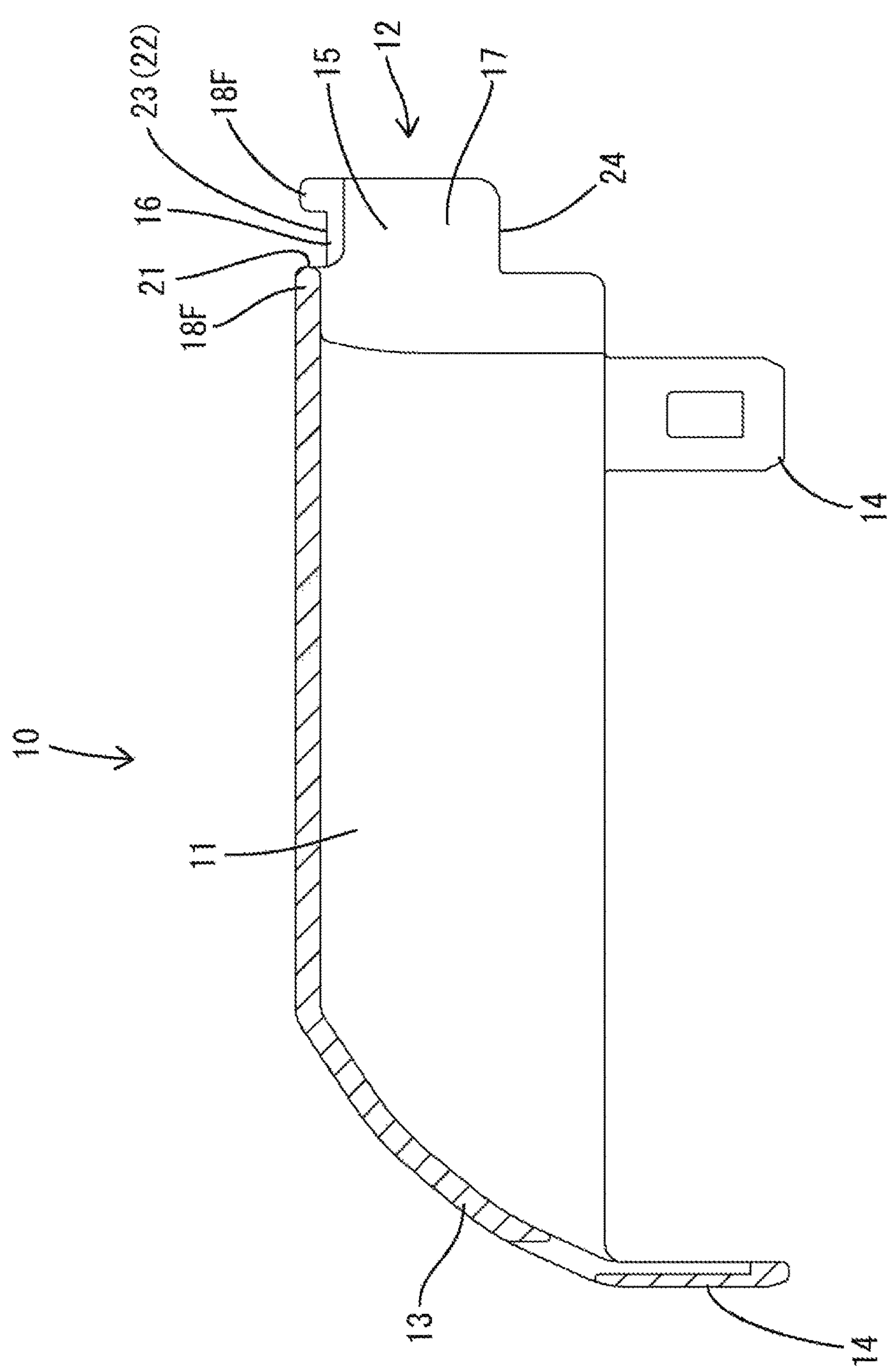
F I G. 6
23 (22)
18F
15
12
17
24
16
21
18F
14
10
11
13
14

F I G. 7
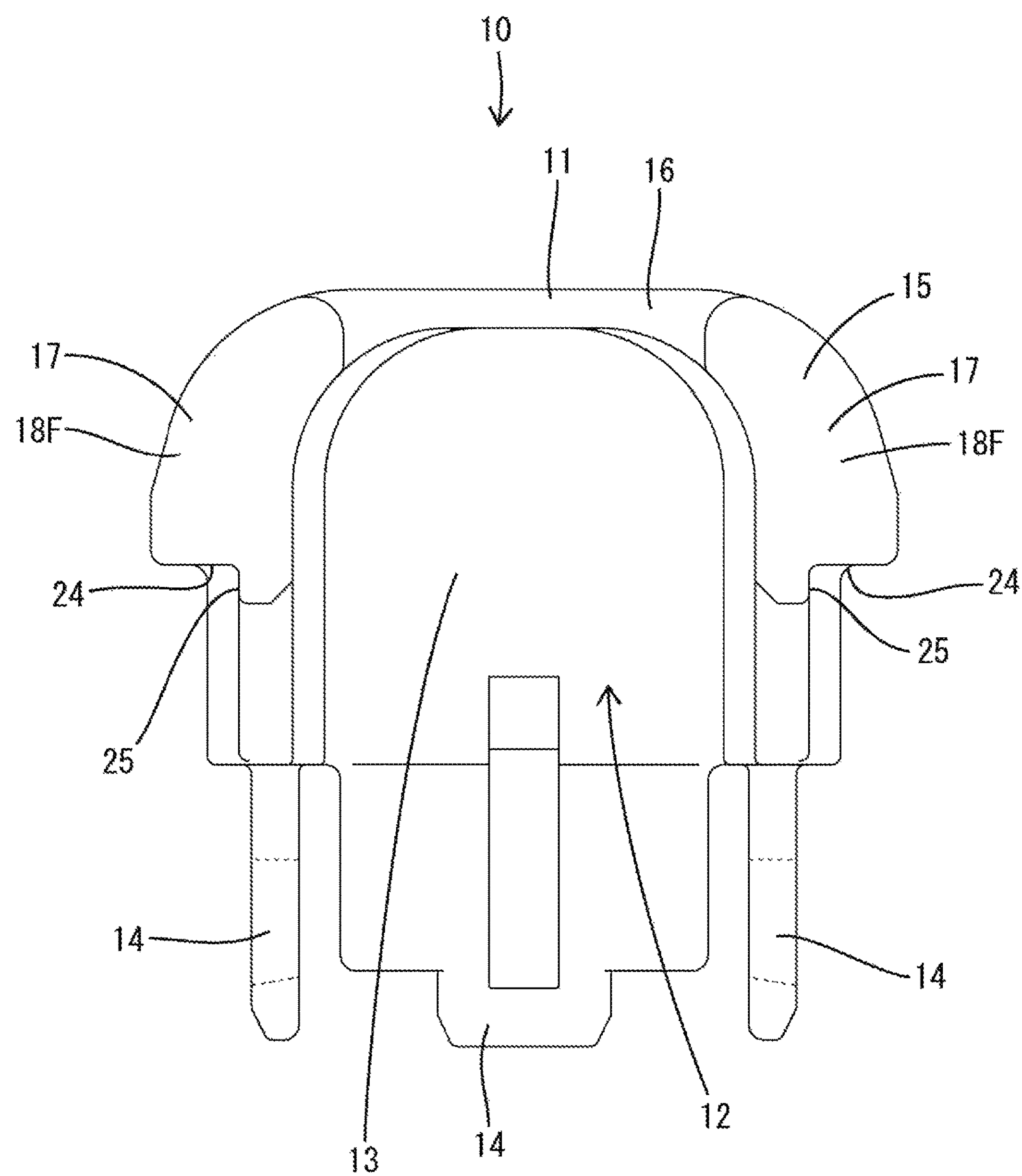

F I G. 9
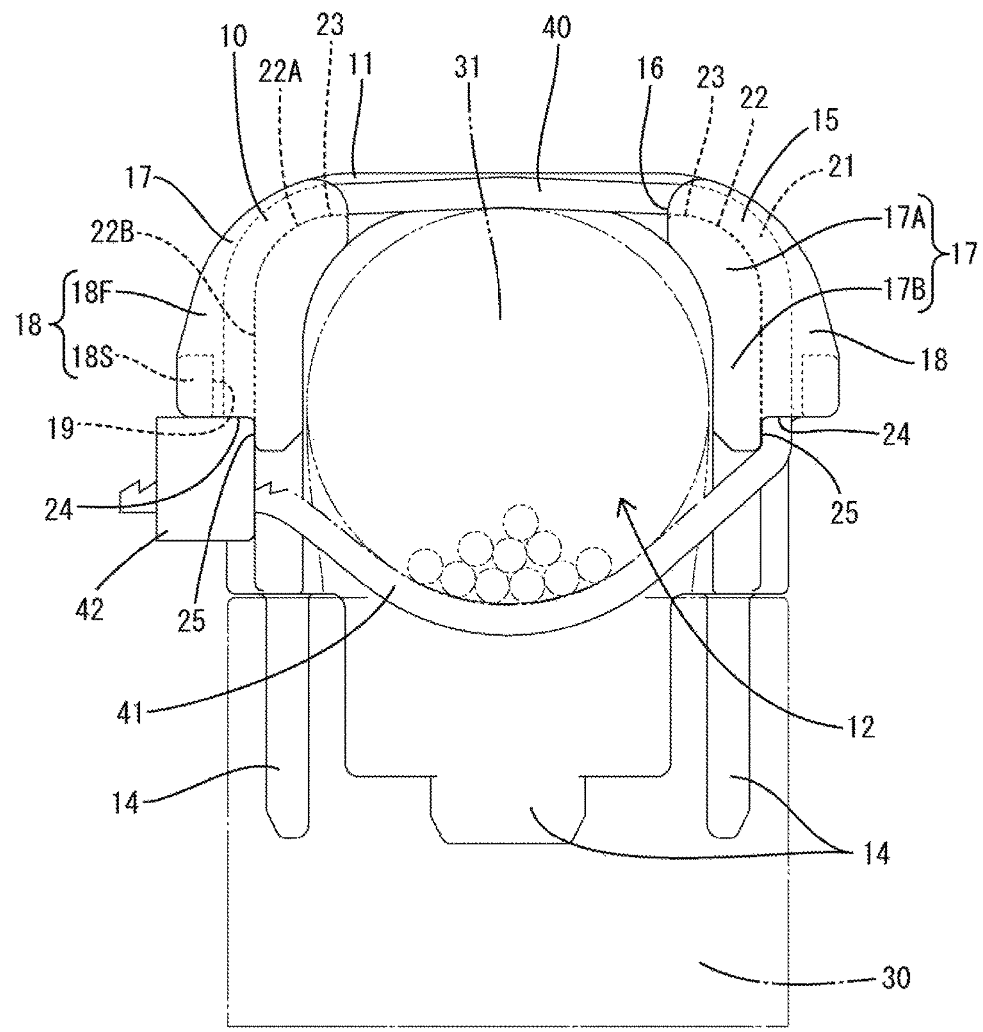

F I G. 1 2
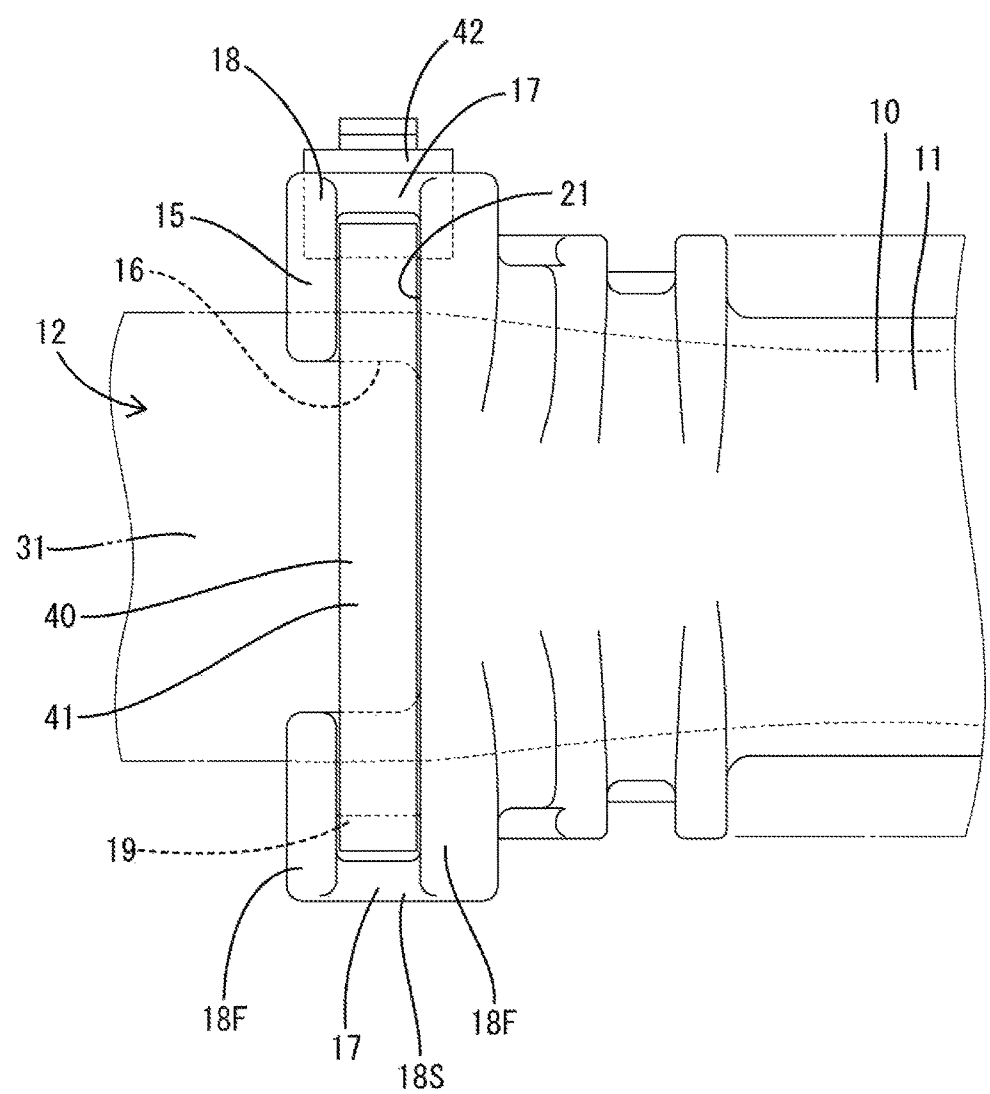

F I G. 1 3
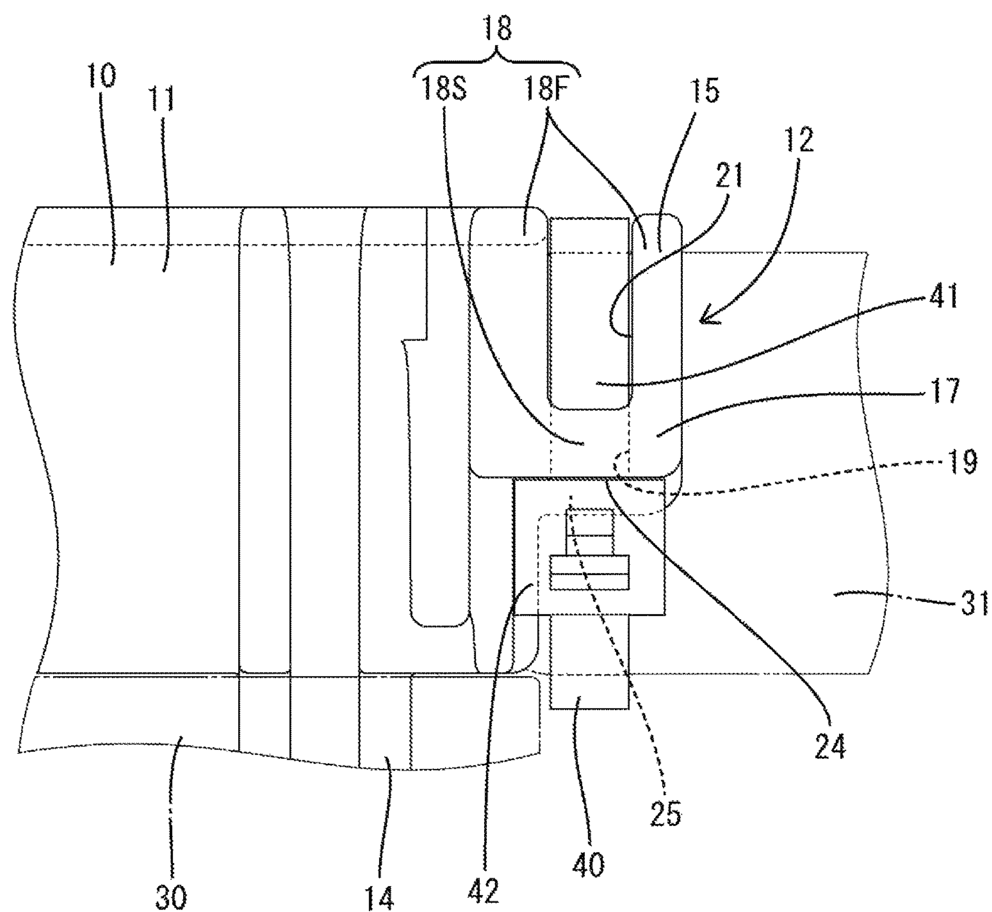

F I G. 1 6
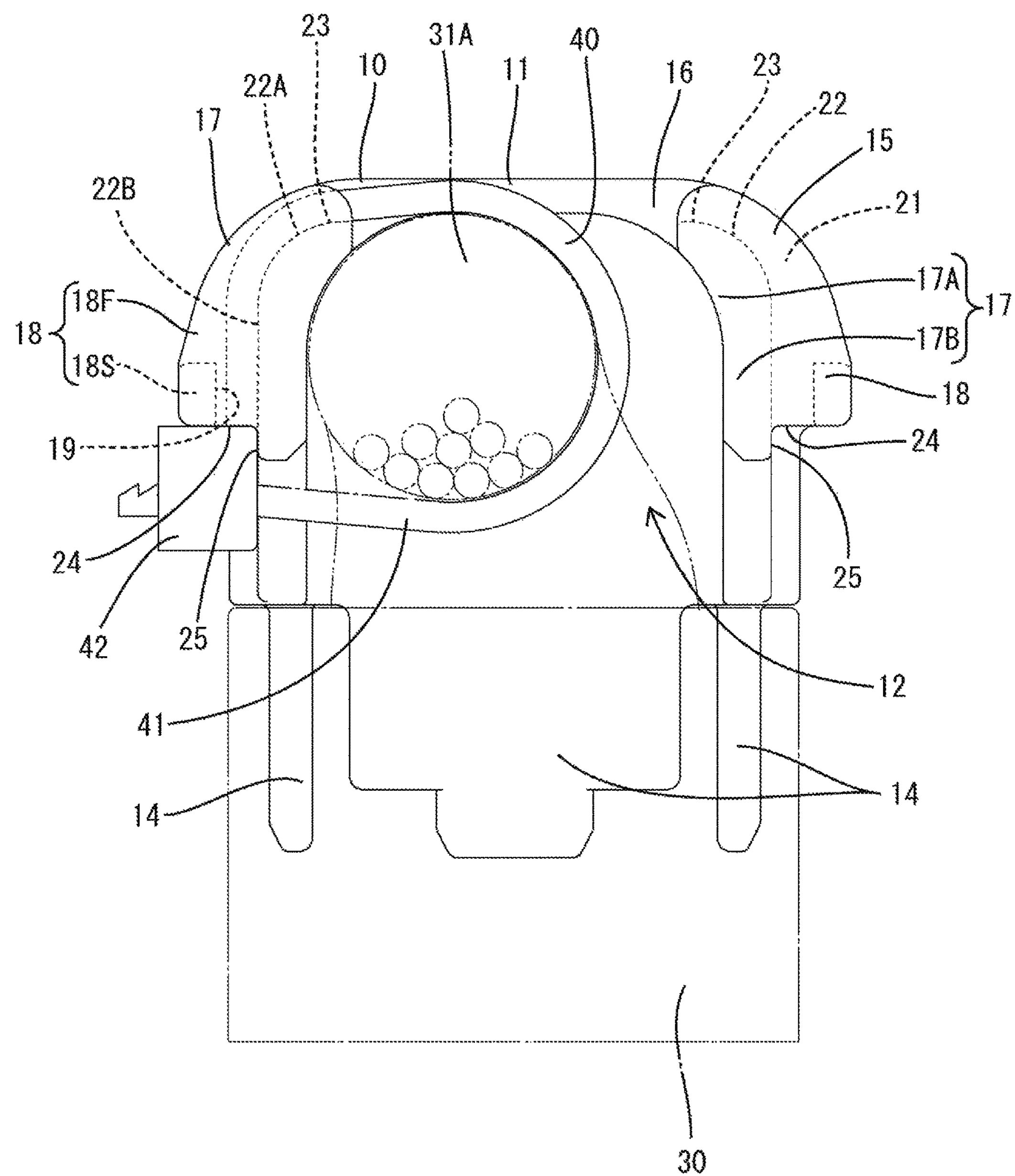

F I G. 1 9
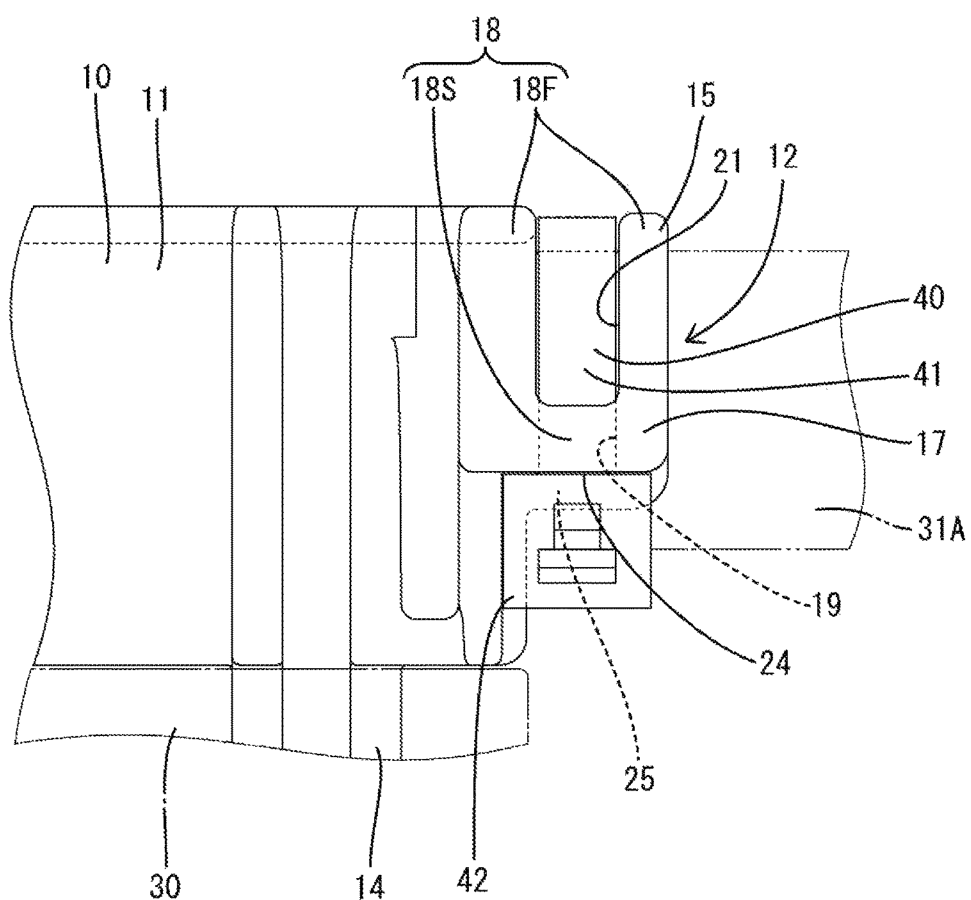

WIRE COVER

BACKGROUND

1. Field of the Invention

The present invention relates to a wire cover.

2. Description of the Related Art

Japanese Unexamined Patent Publication No. 2002-343497 discloses a connector with a housing and a wire cover mounted on a rear surface of the housing. A wire fixing portion is formed on the wire cover and has a U-shaped cross-section open on a front surface. A bundle of wires is pulled out in a predetermined direction from the rear surface of the housing and is fixed to the wire cover by winding a binding band. The binding band is tightened to press the bundle of wires against the inner side of the wire fixing portion.

However, the wire fixing portion may be deformed open if a certain force is applied, for example, during delivery to a harness assembling factory in a state before the bundle of wires is fixed. A deformed wire fixing portion may prevent firm affixation of the wire bundle. Further, the binding band may turn in a circumferential direction during a winding operation of the binding band and it may be difficult to tighten the bundle of wires sufficiently.

The invention is based on the above situation and aims to provide a wire cover capable of firmly fixing a bundle of wires.

SUMMARY

The invention is directed to a wire cover to be mounted on a rear part of a housing. The wire cover enables wires pulled out from the rear of the housing to be guided in a predetermined direction. The wire cover includes a band inserting portion having a curved shape to extend circumferentially along a part of an outer surface of the bundle of wires. The band inserting portion defines a route for a binding member for binding the bundle of wires. An end part of the band inserting portion in the circumferential direction includes a lock fixing portion that is configured to position a lock of the binding member for locking a band wound around the bundle of wires at a predetermined position. A reinforcing portion is provided on the lock fixing portion.

The reinforcing portion is at a circumferential end of the band inserting portion that is most likely to be deformed, thereby preventing deformation of the band inserting portion. Further, the lock fixing portion on the circumferential end of the band inserting portion fixes the lock of the binding member to facilitate tightening and fixing of the bundle of wires.

The reinforcing portion may extend in the circumferential direction along a side edge of the band. According to this configuration, the band is positioned by the reinforcing portion. Thus, the bundle of wires can be tightened sufficiently without the band being loosened.

Lock fixing portions may be provided at opposite circumferential ends of the band inserting portion. Thus, tightening of the binding member can be started from either side.

A cut may be provided at an intermediate part of the band inserting portion in the circumferential direction to allow the inside and outside of the band inserting portion to communicate. According to this configuration, even a thin bundle of wires can be tightened sufficiently and fixed firmly by passing the band of the binding member through the cut.

A surface of the band inserting portion along which the band extends may be more forward than a rear surface of the cover main body. Thus, the wound band of the binding member will not project from the rear surface of the cover main body in a thickness direction.

BRIEF DESCRIPTION OF DRAWINGS

FIG. 1 is a section showing a wire cover mounted on a housing to fix a bundle of wires.

FIG. 2 is a perspective view showing the wire cover.

FIG. 6 is a section showing the wire cover.

FIG. 7 is a side view showing a wire pull-out opening side of the wire cover.

FIG. 9 is a side view showing the wire pull-out opening side of the wire cover in the state mounted on the housing to fix the bundle of wires.

FIG. 12 is a partial enlarged rear view showing the band inserting portion in the state where the bundle of wires is fixed.

FIG. 13 is a partial enlarged plan view showing the band inserting portion in the state where the bundle of wires is fixed.

FIG. 16 is a side view showing the wire pull-out opening side of the wire cover in the state mounted on the housing to fix a bundle of thin wires.

FIG. 19 is a partial enlarged plan view showing the band inserting portion in the state where the bundle of thin wires is fixed.

DETAILED DESCRIPTION

Hereinafter, an embodiment of the invention is described in detail with reference to FIGS. 1 to 19.

Figure 3:
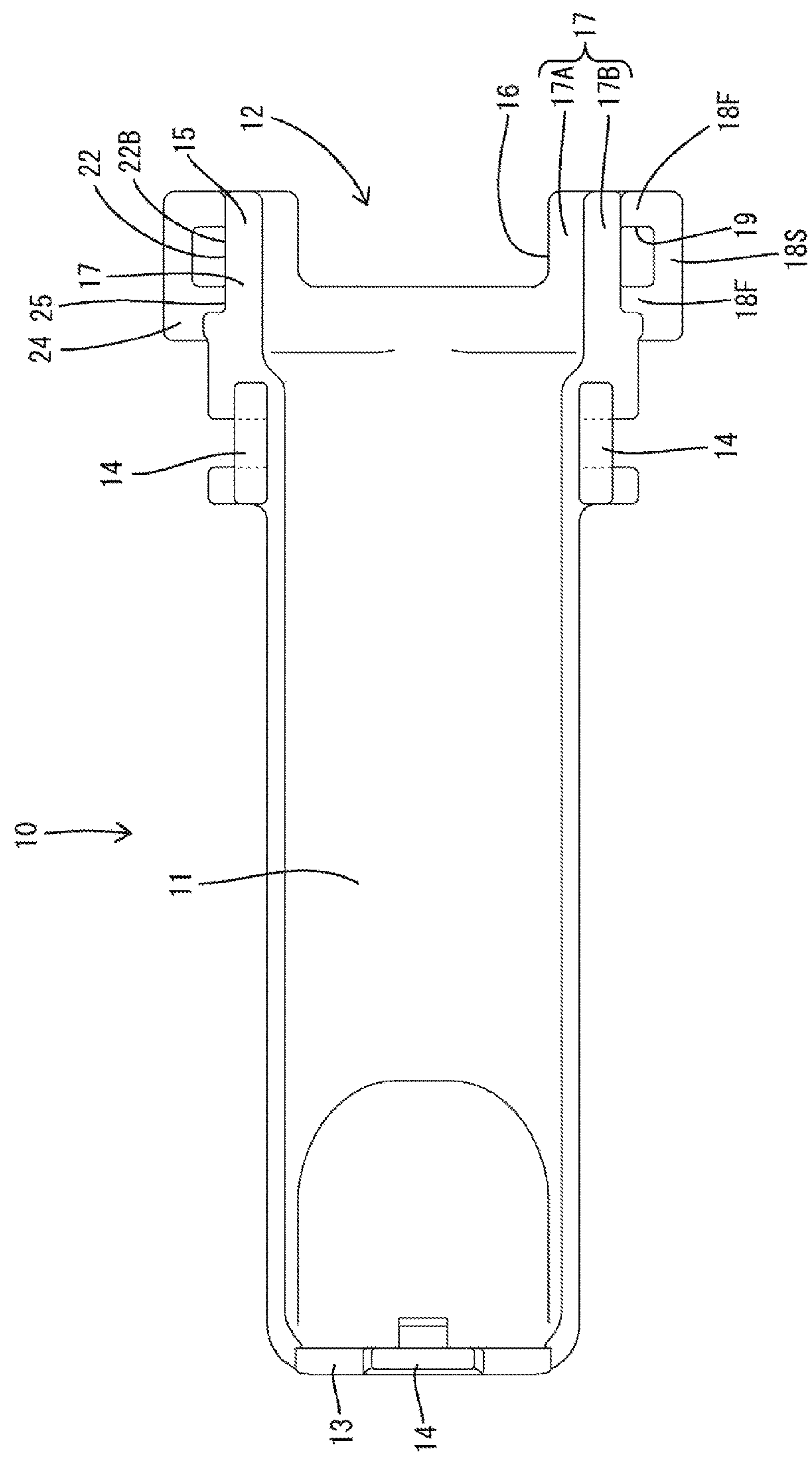
FIG. 3 is a front view showing the wire cover.

A wire cover 10 in this embodiment is mounted on a rear surface side of a housing 30 such that a bundle of wires 31 is pulled out in a predetermined direction from the rear surface of the housing 30. In the following description, a left side and a right side of FIG. 1 are referred to as a front and a rear, and a vertical direction and a lateral direction of FIG. 3 are referred to as a height and a width for each constituent member.

The housing 30 is made of synthetic resin and is substantially in the form of a rectangular parallelepiped long in the width direction. Terminal fittings 32 fixed to ends of the wires 31 are accommodated into the housing 30 from behind.

The wire cover 10 is made of synthetic resin and is in the form of a box long in the width direction. The wire cover 10 is symmetrical with respect to a center in the height direction.

The wire cover 10 includes a main body 11 for covering substantially the entire rear surface of the housing 30. The main body 11 is long in the width direction, one side in the width direction is open by a wire pull-out opening 12 and the other side is closed by a wall 13. The bundle of the wires 31 pulled out backward from the rear surface of the housing 30 is bent substantially at a right angle in the cover main body 11 and pulled out to outside through the wire pull-out opening 12 in a direction substantially parallel to the rear surface of the housing 30.

The cover main body 11 is provided with a plurality of locks 14 to be locked to a rear end of the housing 30. Each lock 14 projects forward from the cover main body 11. The locks 14 are provided on opposite ends of the cover main body 11 in the width direction. Two of the locks 14 are provided on the end part on the side of the wire pull-out opening 12 while being spaced apart from each other in the height direction.

The bundle of the wires 31 is bound by a binding member 40 and fixed to the wire cover 10. The binding member 40 includes a band 41 to be wound around the bundle of the wires 31 and a lock 42 for locking the band 41 at a predetermined position. The band 41 has a length sufficient to be wound around the entire circumference of the bundle of the wires 31 and extends in one direction from the lock 42. The lock 42 is a rectangular block with an insertion hole 43 into which the band 41 is to be inserted (see FIG. 10). The insertion hole 43 is provided with a lock receiving portion 45 for fixing the band 41 by being locked to locking portions 44 provided on the band 41.

The wire cover 10 is provided with a band inserting portion 15 that defines a route for the binding member 40. The band inserting portion 15 is provided at the wire pull-out opening 12 adjacent to the locks 14. The band inserting portion 15 has a curved shape to extend along a part of the outer surface of the bundle of the wires 31 in a circumferential direction and is open forward.

Figure 4:
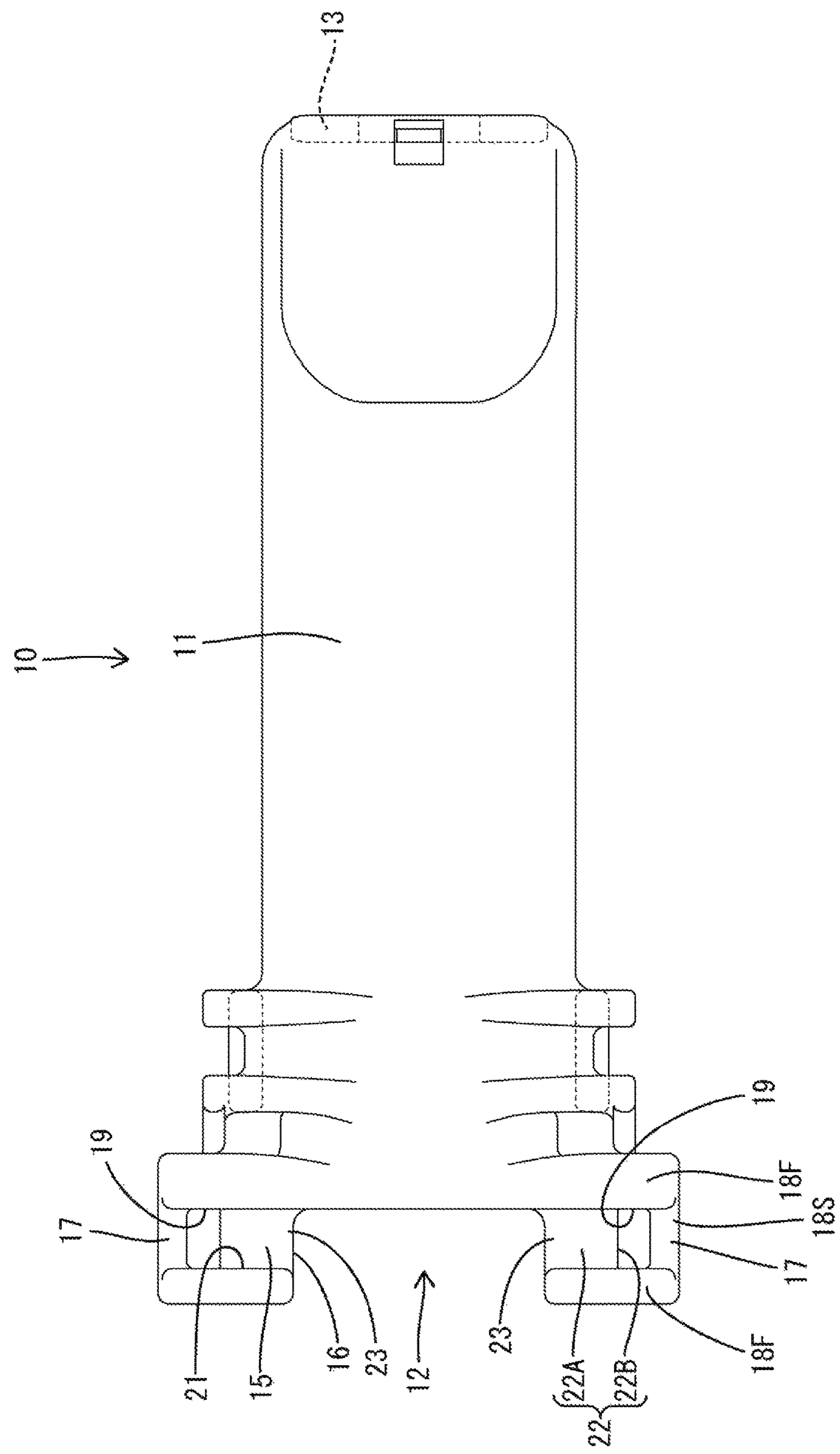
FIG. 4 is a rear view showing the wire cover.
Figure 5:
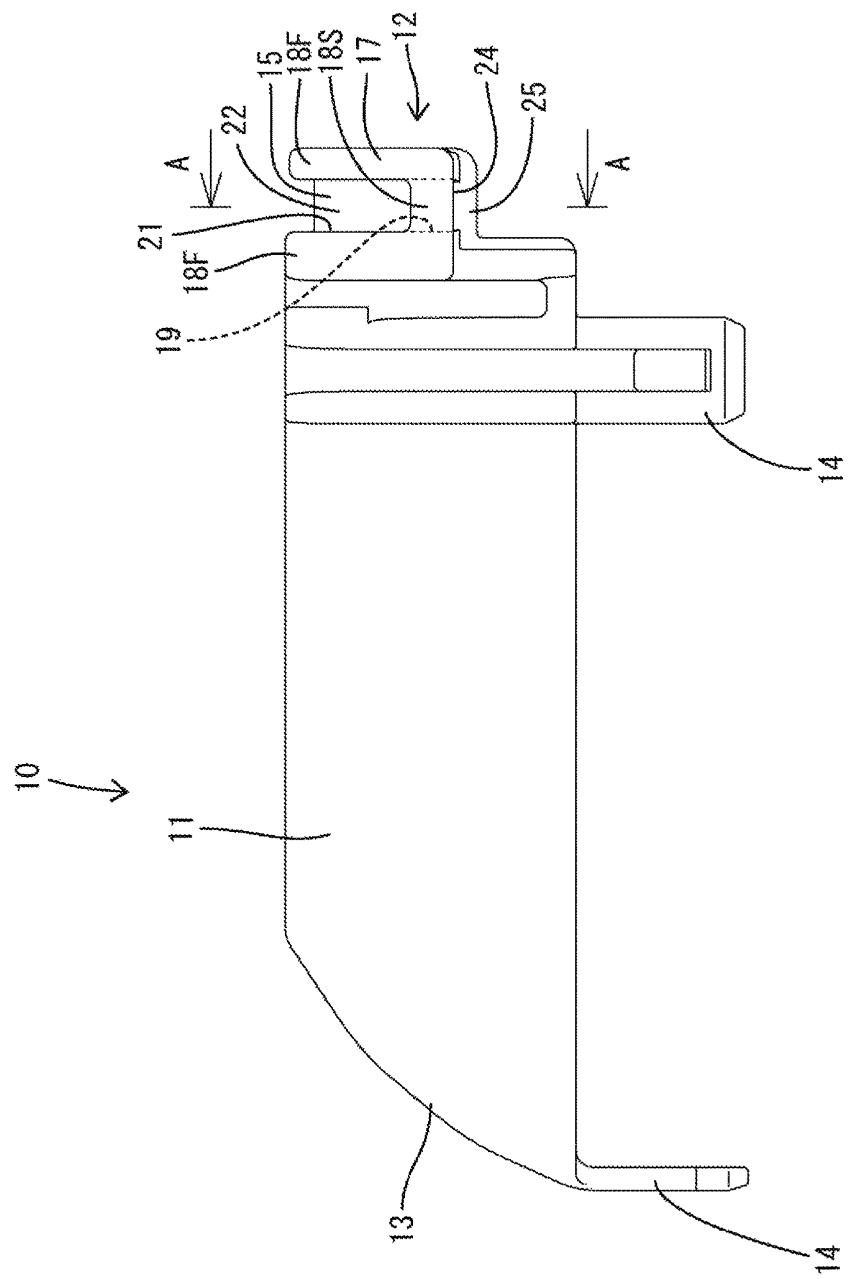
FIG. 5 is a plan view showing the wire cover.
Figure 8:
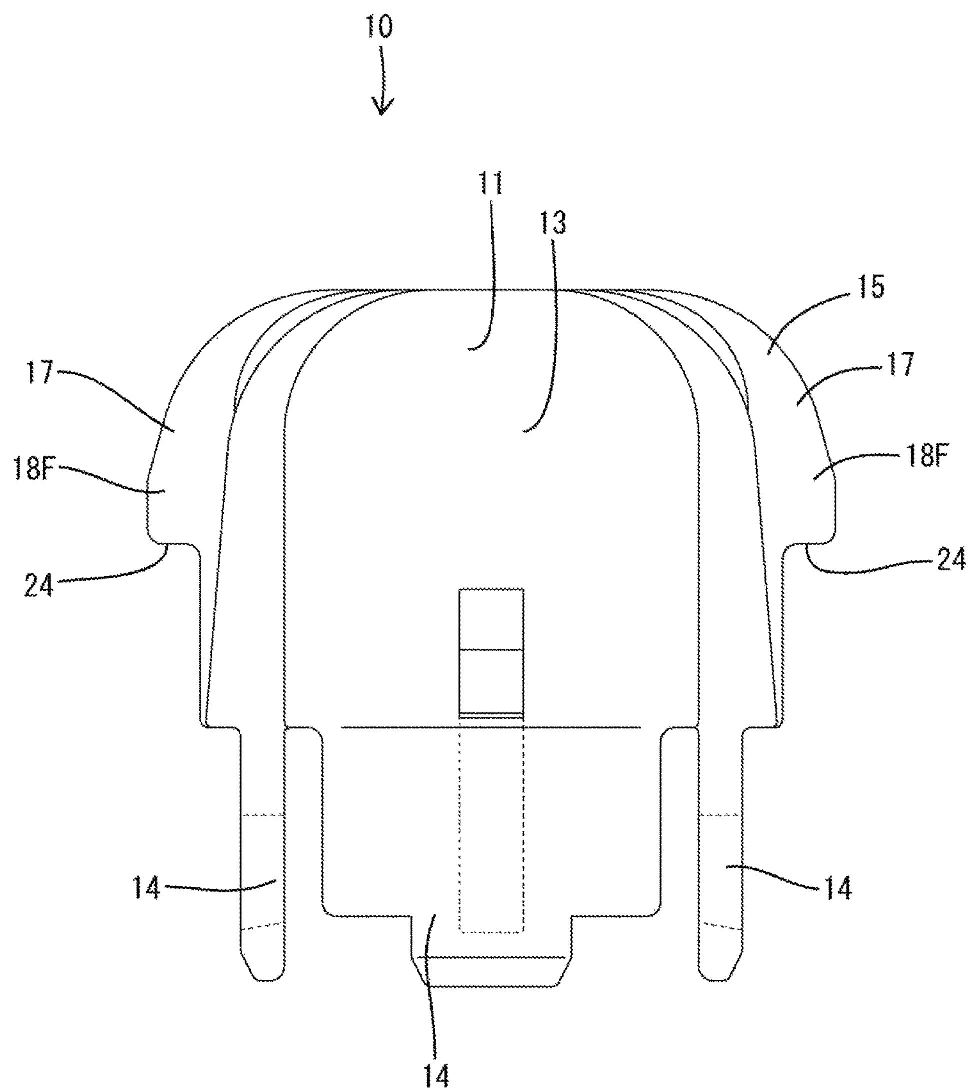
FIG. 8 is a side view showing a closed side of the wire cover.

The band inserting portion 15 is provided with a cut 16 allowing the inside and outside of the band inserting portion 15 to communicate in an in-out direction (front-back direction). The cut 16 is provided at an intermediate part of the band inserting portion 15 in the height direction (intermediate part in the circumferential direction). As shown in FIG. 4, the cut 16 has a rectangular shape long in the height direction when viewed from behind. The cut 16 is entirely open in a pull-out direction of the wires 31 (short side direction).

Figure 10:
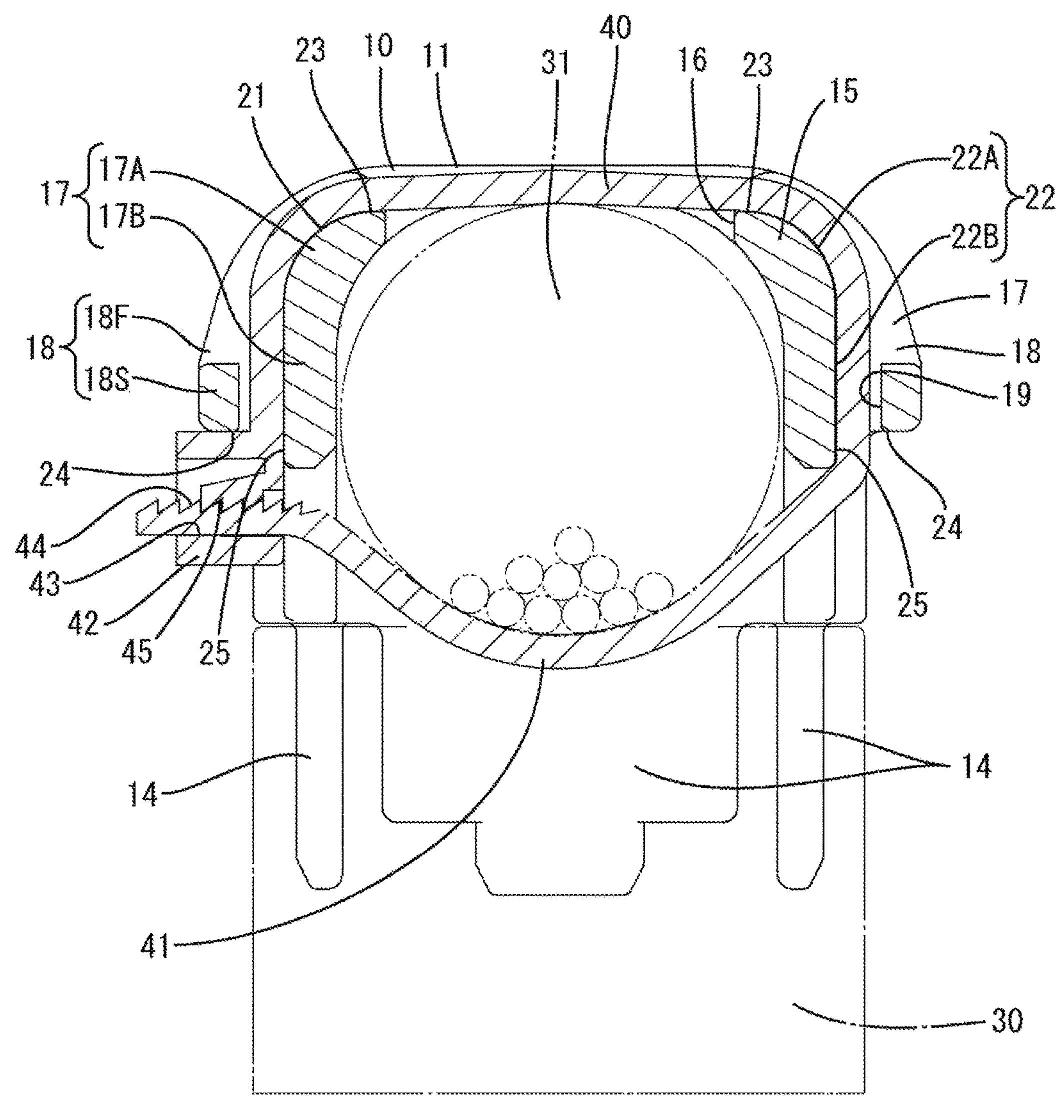
FIG. 10 is a section, corresponding to a cross-section at a position A-A of FIG. 5, of the wire cover in the state mounted on the housing to fix the bundle of wires.
Figure 11:
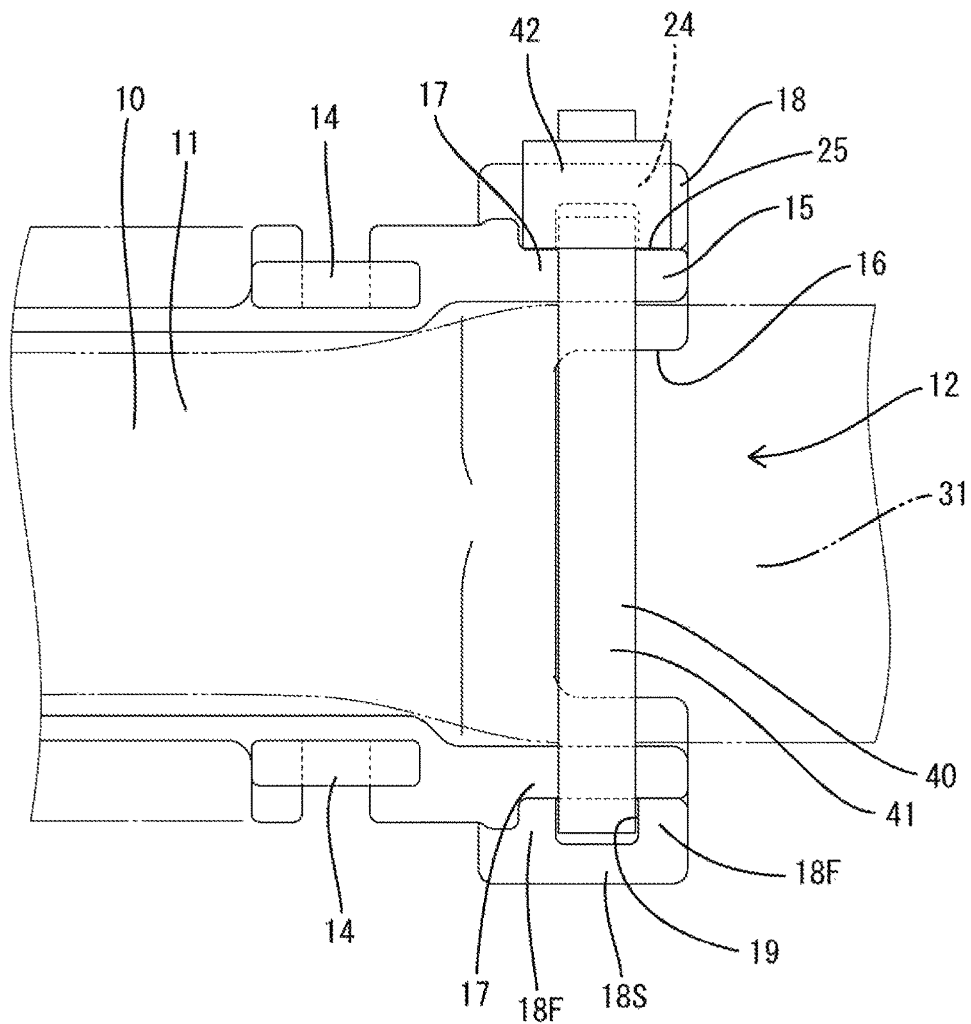
FIG. 11 is a partial enlarged front view showing a band inserting portion in a state where the bundle of wires is fixed.

Lock fixing portions 17 for positioning the lock portion 42 of the binding member 40 are provided at opposite end parts of the band inserting portion 15 in the height direction. Each lock fixing portion 17 has a quarter-circularly curved shape as a whole. As shown in FIG. 10, each lock fixing portion 17 includes an arcuate portion 17A adjacent to the cut portion 16 and a projecting portion 17B projecting forward from a circumferential end (front end) of the arcuate portion 17A. The projecting portions 17B face each other in the height direction (lateral direction in FIG. 10) and are substantially parallel to each other.

Each lock fixing portion 17 has a reinforcing portion 18 that projects out at the lock fixing portion 17. As shown in FIG. 2, each reinforcing portion 18 includes two first reinforcing portions 18F extending in the circumferential direction of the band inserting portion 15 and a second reinforcing portion 18S coupling the first reinforcing portions 18F.

The two first reinforcing portions 18F are substantially parallel to each other and face each other while being spaced apart by a distance matching a width of the band 41 so that the first reinforcing portions 18F extend along opposite side edges of the band 41. The first reinforcing portions 18F have substantially identical outer shapes.

Each first reinforcing portion 18F is a wall formed continuously from an end edge of the arcuate portion 17A on the side of the cut 16 to a position slightly closer to a central side (rear side) than a front end edge of the projecting portion 17B. A wall thickness of the first reinforcing portion 18F is substantially constant. A projecting dimension of the first reinforcing portion 18F is largest at the front end as shown in FIG. 9. The front end surface of the first reinforcing portion 18F is at a substantially right angle to the front-back direction.

One of the first reinforcing portions 18F in each pair is provided along an end edge of the wire cover 10 and the other is provided along the cut 16. The outer surface of a central part of the first reinforcing portion 18F provided along the cut 16 in the height direction is connected to the outer surface of the cover main body 11 without forming a step (see FIG. 6). The first reinforcing portion 18F provided along the end edge of the wire cover 10 is divided by the cut 16.

The second reinforcing portion 18S couples outer sides of front end parts of the pair of first reinforcing portions 18F. The front end surface of the second reinforcing portion 18S is connected to the front end surfaces of the first reinforcing portions 18F without forming a step and is substantially at a right angle to the front-back direction. As shown in FIG. 10, a hole 19 is at an inner side of the second reinforcing portion 18S penetrates in the front-back direction (circumferential direction of the band inserting portion 15). The band 41 of the binding member 40 is insertable through the hole 19. Passing the band 41 through the hole 19 prevents detachment of the binding member 40 from the band inserting portion 15.

The band 41 of the binding member 40 is arranged along a groove 21 formed between a pair of reinforcing walls. As shown in FIG. 10, a bottom surface 22 of the groove 21 (surface of the band inserting portion 15 along which the band 41 extends) is located slightly inwardly of the outer side surface of the cover main body 11.

The bottom surface 22 of the groove 21 includes arcuately curved arcuate surfaces 22A located at opposite sides of the cut 16 and flat surfaces 22B extending forward from one ends of the arcuate surfaces 22A. Most backward parts of the arcuate surfaces 22A at the opposite sides of the cut 16 are referred to hereinafter as bottom surface rear end parts 23 of the bottom surface 22 of the groove 21 and are located slightly before the rear surface of the cover main body 11. Steps in the front-back direction between the bottom surface rear end parts 23 and the rear surface of the cover main body 11 are slightly larger than a thickness of the band 41. The bottom surface rear end parts 23 are substantially at a right angle to the front-back direction.

The front surfaces of the two first reinforcing portions 18F and the second reinforcing portion 18S define a first positioning portion 24 for positioning the lock 42. A backward displacement of the lock 42 is limited by the first positioning portion 24.

The outer side surface of a part of the projecting portion 17B of the lock fixing portion 17 projects farther forward than the reinforcing portion 18 and defines a second positioning portion 25 for positioning the lock 42 and limiting inward displacement of the lock 42.

The first and second positioning portions 24, 25 are substantially at a right angle to each other. The binding member 40 is prevented from turning in the circumferential direction by positioning the lock 42 in the circumferential direction by the first and second positioning portions 24, 25.

Next, an example of an operation of fixing the bundle of the wires 31 to the wire cover 10 of this embodiment is described.

Figure 14:
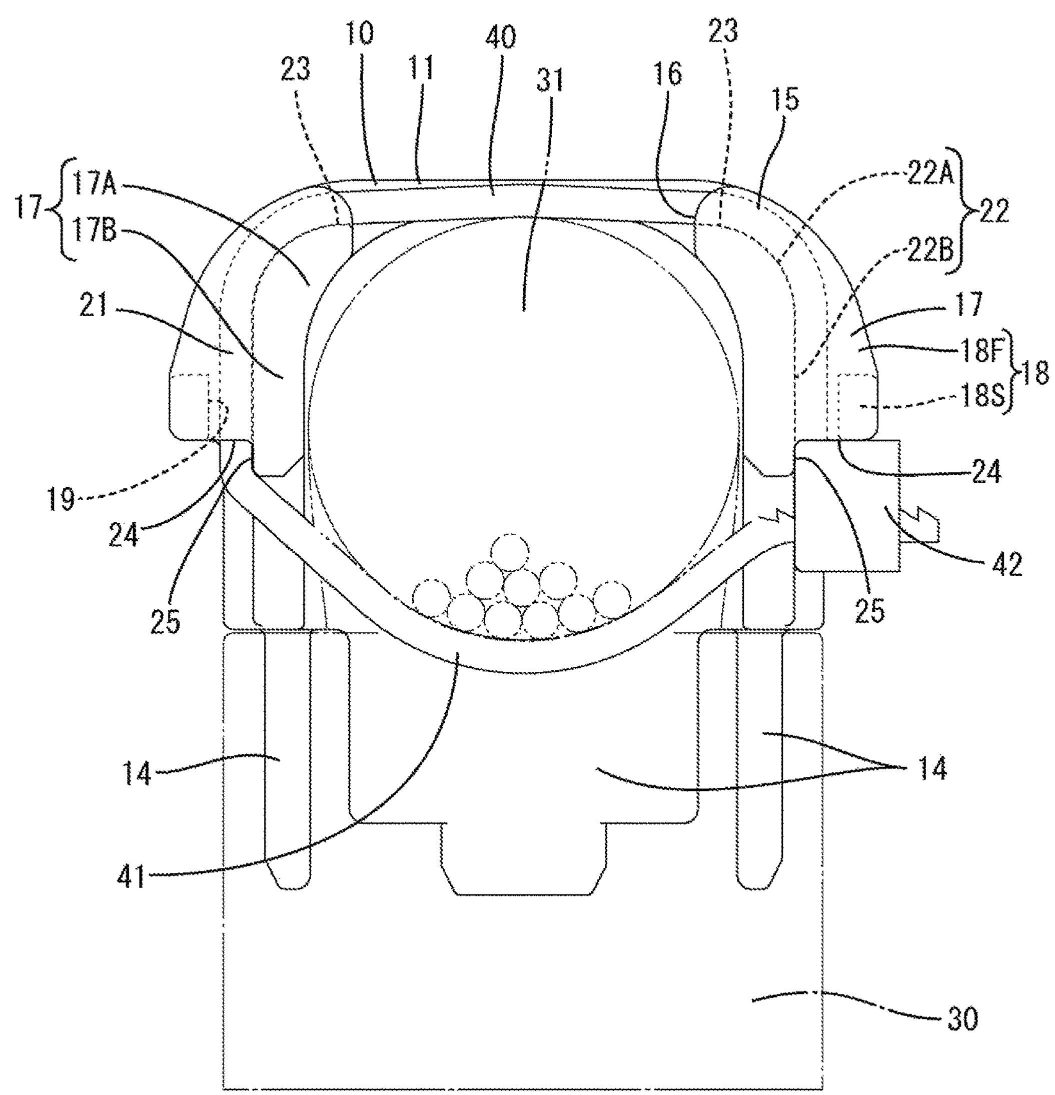
FIG. 14 is a side view showing the wire pull-out opening side of the wire cover in a state mounted on the housing to fix the bundle of wires from an opposite side.
Figure 15:
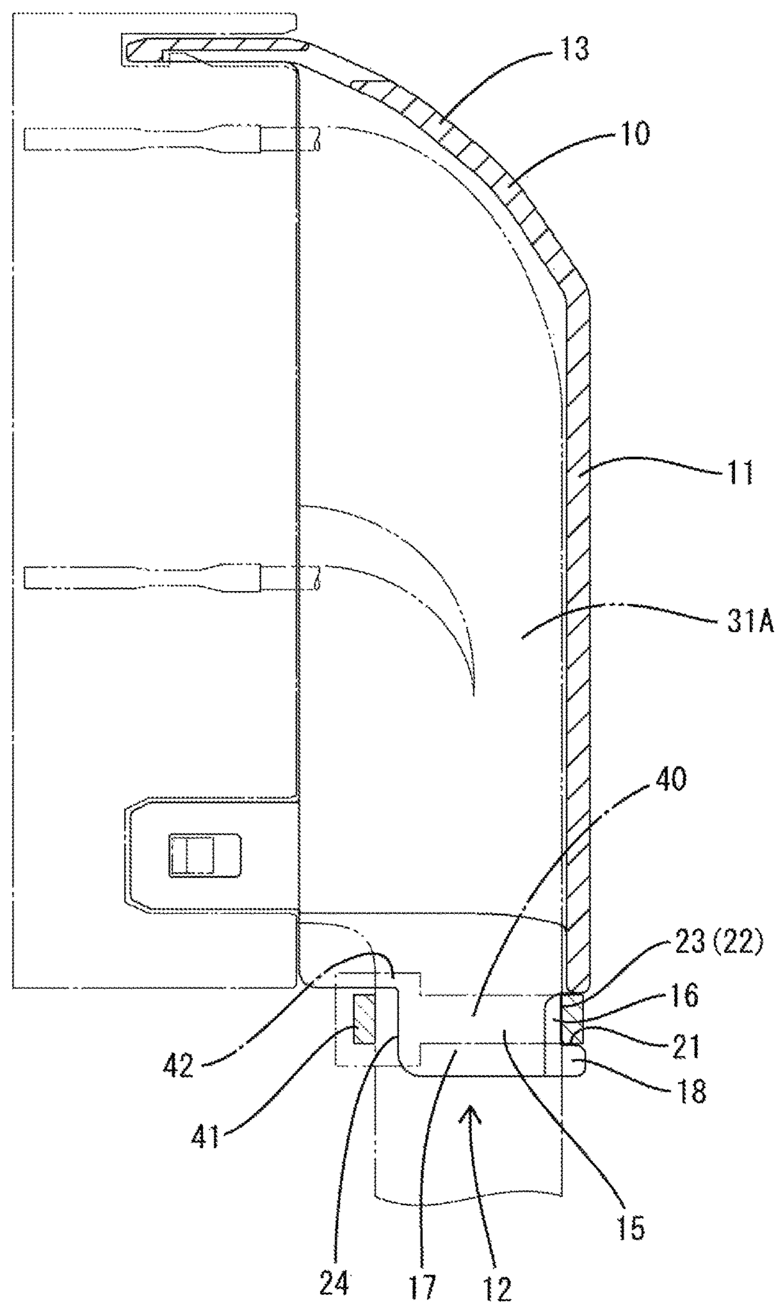
FIG. 15 is a section showing the wire cover in a state mounted on the housing to fix a bundle of thin wires.
Figure 17:
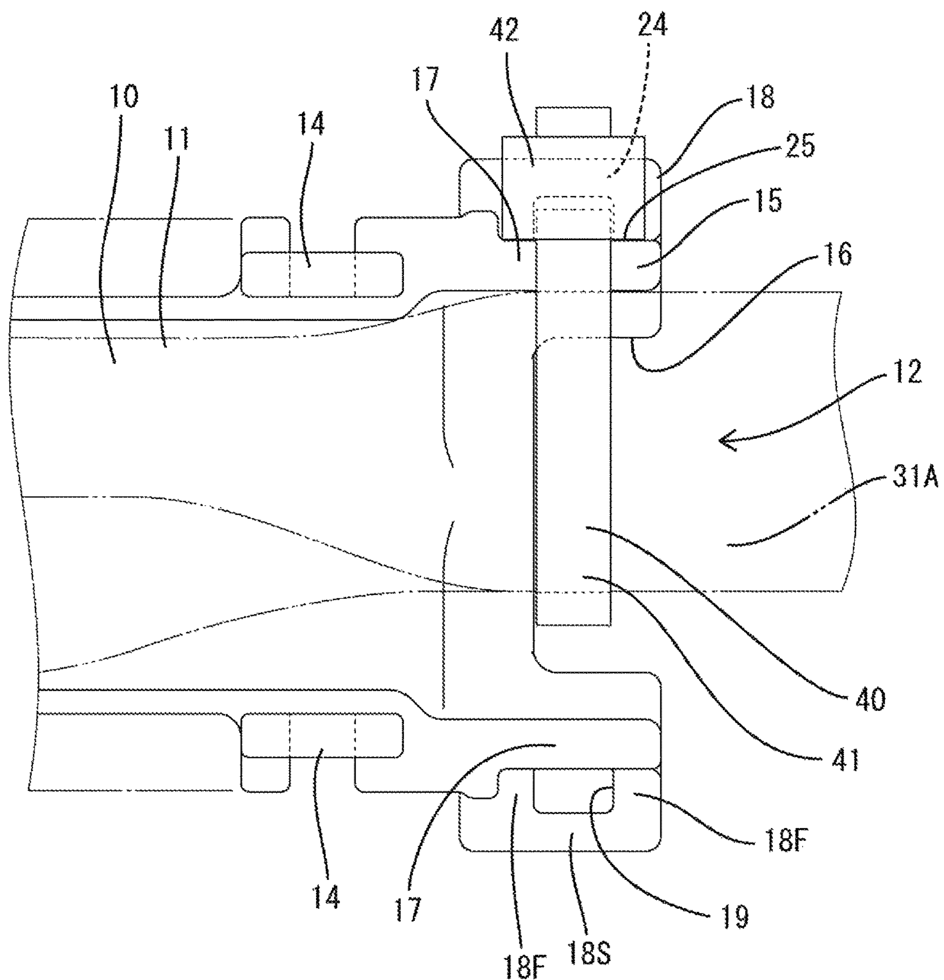
FIG. 17 is a partial enlarged front view showing the band inserting portion in a state where the bundle of thin wires is fixed.
Figure 18:
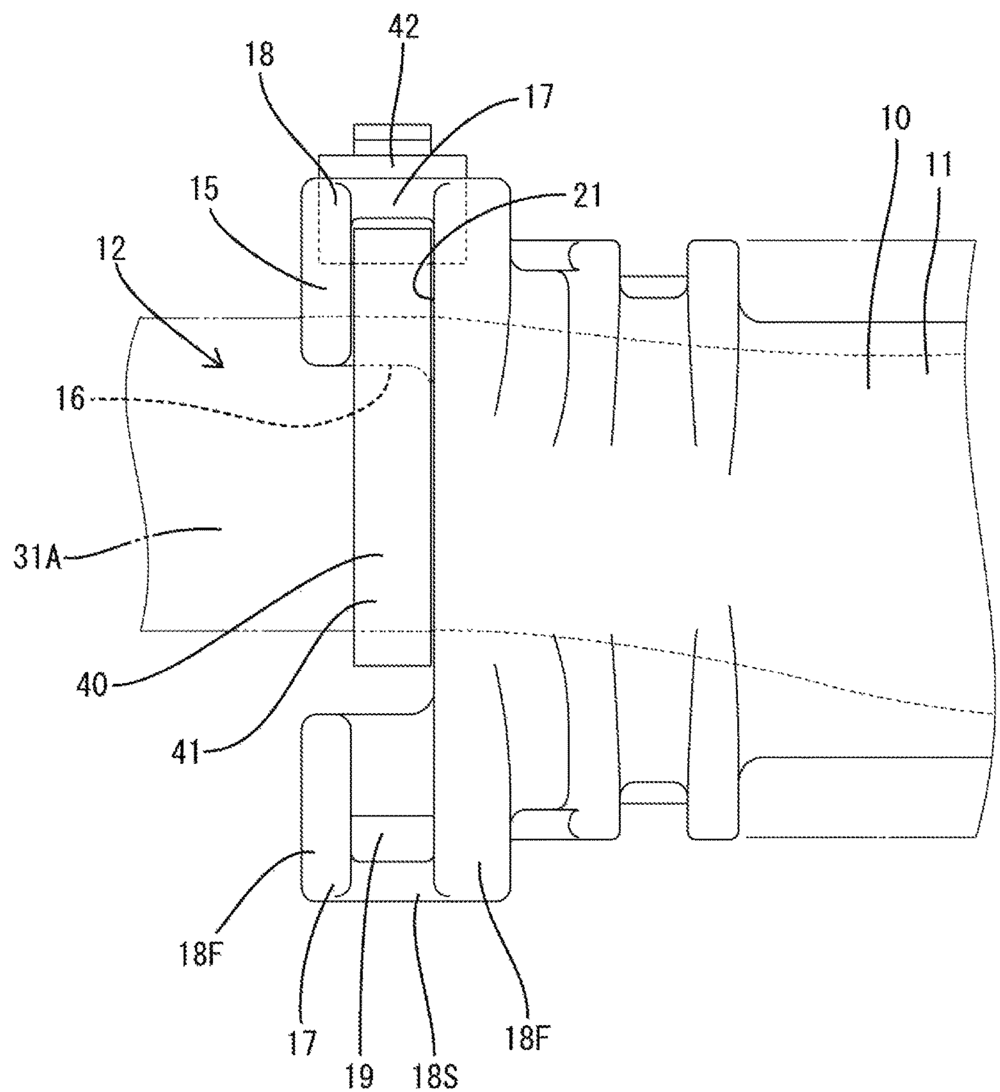
FIG. 18 is a partial enlarged rear view showing the band inserting portion in the state where the bundle of thin wires is fixed.

First, the binding member 40 is wound such that the bundle of the wires 31 extends along the inner surface of the band inserting portion 15. At first, the tip of the band 41 of the binding member 40 is passed through the hole 19 of the lock fixing portion 17 from the front and pulled back. At this time, as shown in FIG. 9 or 14, the band 41 can be passed through the hole 19 of the lock fixing portion 17 located on a side where the operation is performed easily, out of the pair of lock fixing portions 17. When the band 41 is pulled back, the lock 42 contacts the first positioning portion 24 from the front to be stopped.

Subsequently, the band 41 is brought to the side of the other lock fixing portion 17, passed through the hole 19 of the other lock fixing portion 17 from behind and pulled forward. The band 41 extends across the cut 16 without loosening and is held in close contact with the bottom surface 22 of the groove 21. The band 41 extending forward from the hole 19 is wound around a front side of the bundle of the wires 31 and inserted into the insertion hole 43 of the lock 42. When the band 41 extending out through the insertion hole 43 of the lock 42 is pulled strongly and tightened, a force acts in an inward direction (force resisting the tightening of the band 41) on the lock 42. However, the lock 42 is held in contact with the second positioning portion 25. Thus, an inward movement is limited and the lock 42 is held at a fixed position without being displaced in the circumferential direction. The bundle of the wires 31 is pressed back by the band 41 wound around the front side and pressed strongly against the inner surfaces of the band 41 extending across the cut 16 and the band inserting portion 15. The band 41 tightening the bundle of the wires 31 is held in a tightened state by having the loosening thereof limited by the lock 42.

In the above way, the operation of fixing the bundle of the wires 31 to the wire cover 10 is completed. With the bundle of the wires 31 fixed to the wire cover 10, the band 41 is passed through the two holes 19 at opposite ends in the height direction. Thus, even if the bundle of the wires 31 is shaken strongly, the binding member 40 is not detached from the band inserting portion 15 and held in a reliably fixed state. Further, the band 41 wound around the band inserting portion 15 is accommodated in the groove 21 without projecting toward a side behind the wire cover 10.

If the wires 31 are thin wires 31A having a small diameter, a radius of the bundle of the thin wires 31A is small. Thus, if the band 41 is passed through the both holes 19 of the lock fixing portions 17, a large clearance is formed between the bundle of the thin wires 31A and the band inserting portion 15 and the bundle of the thin wires 31A cannot be sufficiently tightened.

In such a case, as shown in FIG. 16, the band 41 can be passed through only the hole 19 of one of the pair of lock fixing portions 17 and wound around the bundle of the thin wires 31A. Specifically, the band 41 of the binding member 40 is passed through the hole 19 of the one lock fixing portion 17 from the front and pulled back to position the lock 42, turned inward of the band inserting portion 15 and wound round the bundle of the thin wires 31A in the cut portion 16, and inserted into the lock 42 and tightened. The band 41 is held in close contact with the bottom surface 22 of the groove 21 of the one lock fixing portion 17 and the bundle of the thin wires 31A. The bundle of the thin wires 31A is pressed strongly against the inner surface of the one lock fixing portion 17 by the band 41 and firmly fixed.

Functions and effects of the embodiment configured as described above are described.

The wire cover 10 of this embodiment is mounted on the rear surface of the housing 30 to pull out the bundle of the wires 31 in the predetermined direction from the rear surface of the housing 30, and includes the band inserting portion 15 to which the binding member 40 for binding the bundle of the wires 31 is to be fixed. The band inserting portion 15 has a curved shape to extend along the part of the outer surface of the bundle of the wires 31 in the circumferential direction. The lock fixing portions 17 for positioning the lock portion 42 of the binding member 40 are provided on the opposite ends of the band inserting portion 15 in the circumferential direction and each lock fixing portion 17 is provided with the reinforcing portion 18.

The reinforcing portions 18 are at opposite circumferential ends of the band inserting portion 15 that are most likely to be deformed. Thus, deformation of the band inserting portion 15 can be suppressed efficiently. Further, the lock 42 of the binding member 40 is positioned by the lock fixing portions 17 at the opposite circumferential ends of the band inserting portion 15. Thus, the bundle of the wires 31 can be tightened sufficiently and fixed firmly by the binding member 40.

The reinforcing portions 18 extend in the circumferential direction along the side edges of the band 41. Thus, the band 41 is positioned by the reinforcing portions 18 so that the bundle of the wires 31 can be tightened sufficiently without the band 41 being loosened.

The lock fixing portions 17 are at the opposite end parts of the band inserting portion 15 in the circumferential direction. Thus, the lock 42 of the binding member 40 can be positioned at both sides of the band inserting portion 15 so that the tightening operation of the binding member 40 can be started at either side. As a result, the assembling operation can be improved.

The cut 16 is provided at the intermediate part of the band inserting portion 15 in the circumferential direction so that the inside and outside of the band inserting portion 15 communicate. According to this configuration, even if the bundle of the wires 31 is thin, the bundle of the thin wires 31A can be tightened sufficiently and fixed firmly by passing the band portion 41 of the binding member 40 through the cut 16.

The cover main body 11 covers a part of the bundle of the wires 31 arranged from the rear surface of the housing 30 to the band inserting portion 15, and the surface 22 of the band inserting portion 15 along which the band portion 41 extends is located more forward than the rear surface of the cover main body 11. According to this configuration, the wound band 41 of the binding member 40 cannot project from the rear surface of the cover main body 11 in a thickness direction. Specifically, if the band 41 projects back from the wire cover 10 in the thickness direction, it is disadvantageous when there is a space limitation. However, the band 41 does not project from the rear surface of the cover main body 11 in the thickness direction (the position of the rear surface of the wire cover 10 remains unchanged even if the binding member 40 is wound), which is advantageous when there is a space limitation.

The present invention is not limited to the above described and illustrated embodiment. For example, the following embodiments also are included in the scope of the invention.

The wire cover 10 is configured so that the bundle of the wires 31 is bent to be substantially parallel to the rear surface of the housing 30 and pulled out in the above embodiment. However, the invention can be also applied, for example, to a wire cover configured so that a bundle of wires is pulled out straight back from the rear surface of a housing.

The reinforcing portion 18 includes the pair of first reinforcing portions 18F and the second reinforcing portion 18S in the above embodiment. However, the reinforcing portion can be changed to have an arbitrary structure capable of reinforcing the lock fixing portion.

The lock fixing portions 17 are provided on the opposite ends of the band inserting portion 15 in the circumferential direction in the above embodiment. However, the lock fixing portion may be provided on one end part of the band inserting portion in the circumferential direction.

Although the band inserting portion 15 is provided with the cut 16 in the above embodiment, the cut portion may not necessarily be provided.

The bottom surface 22 of the groove 21 is more forward than the rear surface of the cover main body 11 in the above embodiment. However, a bottom surface of a groove may be at the same position as the rear surface of a cover main body or more backward than the rear surface of the cover main body.

LIST OF REFERENCE SIGNS

10 . . . wire cover
11 . . . cover main body
15 . . . band insertion portion
16 . . . cut portion
17 . . . lock fixing portion
18 . . . reinforcing portion
22 . . . bottom surface of groove
30 . . . housing
31 . . . wire
40 . . . binding member
41 . . . band
42 . . . lock

What is claimed is:

1. A wire cover (10), comprising:

a cover main body to be mounted on a rear surface of a housing and configured such that a bundle of wires pulled out from the rear surface of the housing is guided in a predetermined direction substantially parallel to the rear surface of the housing and through a wire pull-out opening of the wire cover;

first and second lock fixing portions extending from opposite sides of the cover main body at the wire pull-out opening and aligned substantially parallel to the predetermined direction, the lock fixing portions being spaced from one another in a direction normal to the predetermined direction to define a cut; and a pair of reinforcing portions provided on each of the lock fixing portions, the reinforcing portions in each of the pairs being spaced apart in the predetermined direction to define a band inserting portion extending around the lock fixing portions at positions between the reinforcing portions in each of the pairs, the reinforcing portions having edges that intersect surfaces of the lock fixing portions remote from the cut to define concave corners for positioning a lock of a binding band inserted in the band inserting portion and extended across edges of the lock fixing portions remote from the cut.

2. The wire cover of claim 1, wherein the reinforcing portions are provided to extend in a circumferential direction along side edges of the band.

3. The wire cover of claim 2, wherein the lock fixing portions are provided at each of opposite end parts of the band inserting portion in the circumferential direction.

4. The wire cover of claim 2, the cut is provided at an intermediate part of the band inserting portion in the circumferential direction.

5. The wire cover of claim 4, wherein the cover main body has a rear surface opposite the rear surface of the housing, surfaces of the band inserting portion on opposite sides of the cut being recessed relative to the rear surface of the cover main body.

6. The wire cover of claim 1, wherein the lock fixing portions are provided at each of opposite end parts of the band inserting portion in the circumferential direction.

7. The wire cover of claim 1, wherein the cut is provided at an intermediate part of the band inserting portion in the circumferential direction.

8. The wire cover of claim 7, wherein the cover main body has a rear surface opposite the rear surface of the housing, surfaces of the band inserting portion on opposite sides of the cut being recessed relative to the rear surface of the cover main body.

9. The wire cover of claim 1, wherein the reinforcing portions are first reinforcing portions, the wire cover further comprising second reinforcing portions bridging the first reinforcing portions in each pair at locations spaced from the lock fixing portions, the second lock fixing portions being substantially aligned with the respective concave corners.

10. The wire cover of claim 1 wherein the cover main body has side walls with the front edges mounted to the surface of the housing, ends of the lock fixing portions being offset from the front edges of the sidewalls of the cover main body.

11. The wire cover of claim 1 wherein the band used with the wire cover has a first end integral with a first surface of a lock and a second end opposite the first end, the lock having a lock opening extending therethrough and configured for locked engagement with an area of the band in proximity to the first end, the edges one of the pairs of reinforcing portions being engaged with the first surface of the lock, and the surfaces of the lock fixing portions at the concave corners being dimensioned to permit insertion of the second end of the band into the lock opening when the lock is positioned in the concave corner.

* * * * *